(12) United States Patent
Lee

(10) Patent No.: US 11,422,002 B2
(45) Date of Patent: Aug. 23, 2022

(54) NAVIGATOR FOR UPDATING MAP DATA, VEHICLE HAVING THE SAME AND METHOD FOR CONTROLLING THE SAME

(71) Applicants: HYUNDAI MOTOR COMPANY, Seoul (KR); KIA MOTORS CORPORATION, Seoul (KR)

(72) Inventor: Chang Byung Lee, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 772 days.

(21) Appl. No.: 15/974,945

(22) Filed: May 9, 2018

(65) Prior Publication Data

US 2019/0186944 A1 Jun. 20, 2019

(30) Foreign Application Priority Data

Dec. 15, 2017 (KR) .................. 10-2017-0172812

(51) Int. Cl.
  *G01C 21/36* (2006.01)
  *G01C 21/34* (2006.01)
  *G06F 16/29* (2019.01)
  *G01C 21/32* (2006.01)

(52) U.S. Cl.
  CPC ......... *G01C 21/3667* (2013.01); *G01C 21/32* (2013.01); *G01C 21/3453* (2013.01); *G06F 16/29* (2019.01)

(58) Field of Classification Search
  None
  See application file for complete search history.

(56) References Cited

U.S. PATENT DOCUMENTS

| | | | |
|---|---|---|---|
| 7,082,443 B1* | 7/2006 | Ashby | G01C 21/32 707/999.201 |
| 9,578,093 B1* | 2/2017 | Gotoh | G06F 11/3452 |
| 2002/0091485 A1* | 7/2002 | Mikuriya | G01C 21/32 701/450 |
| 2007/0109303 A1* | 5/2007 | Muramatsu | G01C 21/32 345/440 |
| 2010/0225651 A1 | 9/2010 | Nomura | |
| 2016/0370185 A1* | 12/2016 | Gotoh | G06F 9/5083 |
| 2016/0370196 A1* | 12/2016 | Gotoh | G01C 21/32 |

(Continued)

FOREIGN PATENT DOCUMENTS

| | | |
|---|---|---|
| JP | 2002207423 A | 7/2002 |
| JP | 2012-155286 A | 8/2012 |

(Continued)

*Primary Examiner* — Peter D Nolan
*Assistant Examiner* — Michael F Whalen
(74) *Attorney, Agent, or Firm* — Morgan, Lewis & Bockius LLP

(57) ABSTRACT

A navigator includes: a data transceiver configured to receive and transmit changed map data including a gateway list and difference data corresponding to information related to a boundary between divided regions; a DB manager configured to separately store and manage map data for each divided region and configured to update the map data for each divided region under the control of a controller; and a controller configured to control the update of the map data for each divided region based on the gateway list transmitted from the data transceiver.

14 Claims, 8 Drawing Sheets

(56) References Cited

U.S. PATENT DOCUMENTS

2016/0371281 A1\* 12/2016 Gotoh .................... G01C 21/26
2016/0371326 A1\* 12/2016 Gotoh ................... G06T 11/206

FOREIGN PATENT DOCUMENTS

| JP | 2014-209071 A | 11/2014 |
| JP | 2015-001471 A | 1/2015 |
| JP | 2017-090548 A | 5/2017 |
| KR | 10-2011-0008767 A | 1/2011 |
| KR | 10-2016-0132328 A | 11/2016 |
| KR | 10-2017-0052488 A | 5/2017 |

\* cited by examiner

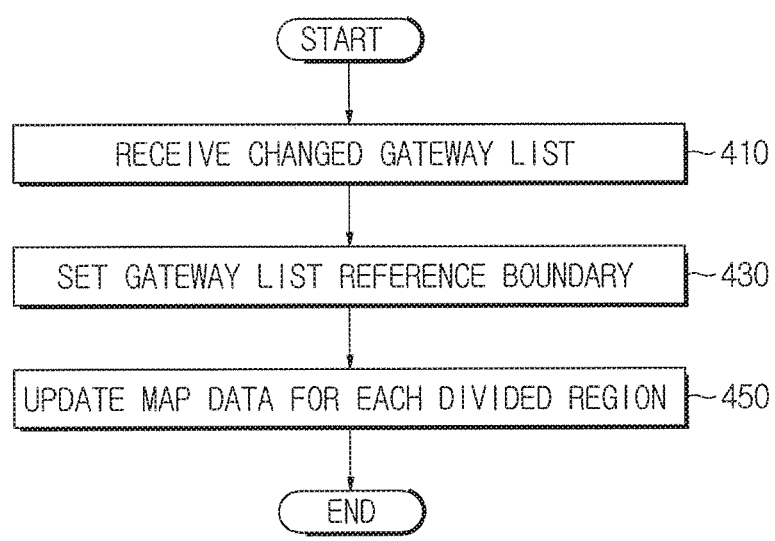

NAVIGATOR FOR UPDATING MAP DATA, VEHICLE HAVING THE SAME AND METHOD FOR CONTROLLING THE SAME

CROSS-REFERENCE TO RELATED APPLICATION(S)

This application is based on and claims the benefit of priority under 35 U.S.C. § 119 to Korean Patent Application No. 10-2017-0172812, filed on Dec. 15, 2017, in the Korean Intellectual Property Office, the disclosure of which is incorporated by reference herein in its entirety

TECHNICAL FILED

The present disclosure relates to a vehicle, a navigator, and a control method of the navigator.

BACKGROUND

A variety of vehicle safety devices have been developed and mounted to a vehicle in consideration with driver's convenience and safety.

Examples of the vehicle safety devices include a safety auxiliary device such as a lane departure warning system configured to prevent a vehicle from deviating from a driving lane by helping a steering wheel operation of a driver when the vehicle is driven on the road, and an additional service device such as a navigator configured to guide a route to a destination, and information related to the vicinity of the route to the destination and the destination that is selected by a driver.

For the above mentioned route guidance, it is required that map data applied to the navigator is accurate. For this, as for the navigator, the update of the map data is required to be performed in real time, but for the real-time updates, a large amount of map data should be downloaded whenever there is change. Therefore, it is not easy that the update of the map data is practically performed.

SUMMARY

An aspect of the present disclosure provides a vehicle, a navigator and a control method of the navigator for allowing the navigator to update map data including changing a boundary of divided region, by itself.

Additional aspects of the present disclosure will be set forth in part in the description which follows and, in part, will be obvious from the description, or may be learned by practice of the present disclosure.

In accordance with one exemplary embodiment of the present disclosure, a navigator includes: a data transceiver configured to receive and transmit changed map data, which includes a gateway list, and difference data, which corresponds to information related to a boundary between divided regions; a DB manager configured to separately store and manage map data for each divided region and configured to update the map data for each divided region under the control of a controller; and a controller configured to control the update of the map data for each divided region based on the gateway list transmitted from the data transceiver.

The gateway includes coordinates, link information of a current region, and link information of an adjacent region.

The controller may sets the gateway list as a new boundary, and copies map data indicating an area between a previous boundary and the new boundary, from map data of a previous region into map data of a new region, and the controller deletes the map data indicating the area between the previous boundary and the new boundary from the map data of the previous region.

The controller sets the gateway list as a new boundary and copies map data indicating an area between a previous boundary and the new boundary, from map data of a previous region to map data of a new region while the controller stores entire parcel including the new boundary.

When the gateway is defined in the map data, the gateway list received by the data transceiver comprises only gateway identification information.

When the gateway is not defined in the map data, the gateway list received by the data transceiver comprises gateway information such as coordinates, link information of a current region and link information of an adjacent region.

The gateway list may be such that gateways are sequentially arranged from one side to the other side of the boundary.

In accordance with another exemplary embodiment of the present disclosure, a vehicle includes: a data transceiver configured to receive and transmit changed map data, which includes a gateway list, and difference data, which corresponds to information related to a boundary between divided regions; a DB manager configured to separately store and manage map data for each divided region and configured to update the map data for each divided region under the control of a controller; and a controller configured to control the update of the map data for each divided region based on the gateway list transmitted from the data transceiver.

The gateway includes coordinates, link information of a current region, and link information of an adjacent region.

The controller may sets the gateway list as a new boundary, and copies map data indicating an area between a previous boundary and the new boundary, from map data of a previous region into map data of a new region, and the controller deletes the map data indicating the area between the previous boundary and the new boundary from the map data of the previous region.

The controller sets the gateway list as a new boundary and copies map data indicating an area between a previous boundary and a new boundary, from map data of a previous region to map data of a new region while the controller stores entire parcel including the new boundary.

When the gateway is defined in the map data, the gateway list received by the data transceiver comprises only gateway identification information.

When the gateway is not defined in the map data, the gateway list received by the data transceiver comprises gateway information such as coordinates, link information of the current region and link information of the adjacent region.

In accordance with still another exemplary embodiment of the present disclosure, a control method of a navigator includes: receiving changed gateway list by the navigator; setting, by a controller, a new boundary based on the gateway list; and updating, by the controller, map data for each divided region based on the gateway list.

The gateway comprises coordinates, link information of a current region, and link information of an adjacent region.

The update of the map data for each divided region includes copying the map data indicating an area between a previous boundary and a new boundary with respect to the new boundary, from map data of a previous region into map data of a new region, and deleting the map data indicating the area between the previous boundary and the new boundary from the map data of the previous region.

The update of the map data for each divided region includes copying map data indicating an area between a previous boundary and a new boundary with respect to the new boundary, from map data of a previous region to map data of a new region while storing entire parcel including the new boundary.

When the gateway is defined in the map data, the gateway list comprises only gateway identification information.

When the gateway is not defined in the map data, the gateway list comprises gateway information such as coordinates, link information of the current region and link information of the adjacent region.

The gateway list may be such that gateways are sequentially arranged from one side to the other side of the boundary.

BRIEF DESCRIPTION OF THE DRAWINGS

These and/or other aspects of the disclosure will become apparent and more readily appreciated from the following description of embodiments, taken in conjunction with the accompanying drawings of which:

FIG. 8 is a flowchart illustrating a control method of the navigator.

DETAILED DESCRIPTION

Figure 1:
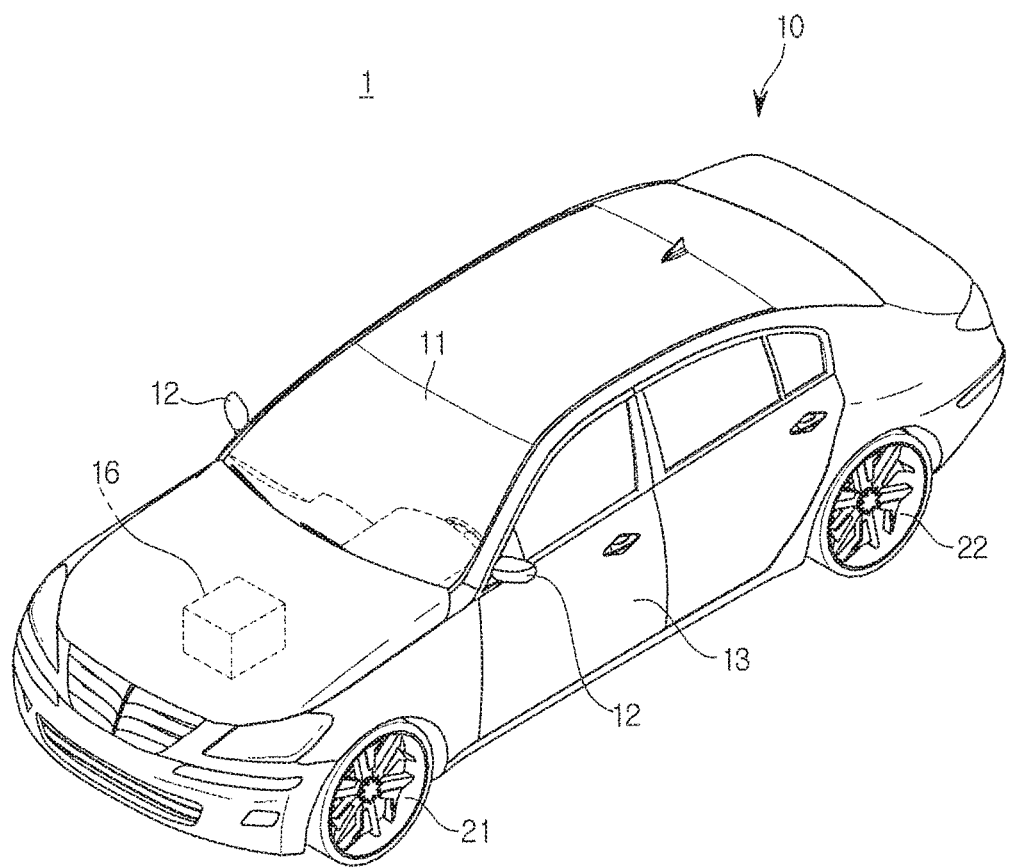
FIG. 1 is an exterior view illustrating a vehicle.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present disclosure, examples of which are illustrated in the accompanying drawings.

FIG. 1 is an exterior view illustrating a vehicle.

Referring to FIG. 1, an exterior of a vehicle 1 may include a body 10 forming an exterior of the vehicle 1, a windscreen 11 providing a front view of the vehicle 1 to a driver, a side mirror 12 providing a view of a rear side of the vehicle 1 to the driver, a door 13 closing the inside of the vehicle 1 from the outside, and vehicle wheels 21 and 22 moving the vehicle 1 by including a front wheel 21 disposed on a front side of the vehicle and a rear wheel 22 disposed on a rear side of the vehicle.

The windscreen 11 may be provided on an upper portion of the front of the body 10 to allow a driver inside the vehicle 1 to acquire visual information about the front of the vehicle 1. The side mirror 12 may include a left side mirror provided on the left side of the body 10 and a right side mirror provided on the right side of the body 10, and may allow a driver inside the vehicle 1 to acquire visual information of the lateral side and the rear side of the vehicle 1.

The door 13 may be rotatably provided on a right side and a left side of the body 10. When the door 13 is opened, a driver may be allowed to be seated in the vehicle 1, and when the door 13 is closed, the inside of the vehicle 1 may be closed from the outside.

In addition to above mentioned components, the vehicle 1 may include a driving device 16 configured to rotate the wheels 21 and 22, a steering system (not shown) configured to change the driving direction of the vehicle 1, and a brake system (not shown) configured to stop the driving of the wheels.

The driving device 16 may supply a torque to the front wheel 21 or the rear wheel 22 so that the body 10 may be moved back and forth. The driving device (not shown) may include an engine configured to generate a torque by burning fossil or may include a motor configured to generate a torque by receiving the power from a battery (not shown).

The steering system may include a steering wheel 42 (refer to FIG. 2) receiving a driving direction from a driver, a steering gear (not shown) changing a rotary motion of the steering wheel to a reciprocating motion, and a steering link (not shown) delivering the reciprocating motion of the steering gear (not shown) to the front wheel 21. Accordingly, the steering system may change the driving direction of the vehicle 1 by changing the direction of the rotary axis of the wheels.

The brake system may include a brake pedal (not shown) receiving a brake operation from a driver, a brake drum (not shown) coupled to the wheels 21 and 22, and a brake shoe (not shown) stopping the rotation of the brake drum (not shown) by using friction force. Accordingly, the brake system may stop the driving of the vehicle 1 by stopping the rotation of the wheels 21 and 22.

Figure 2:
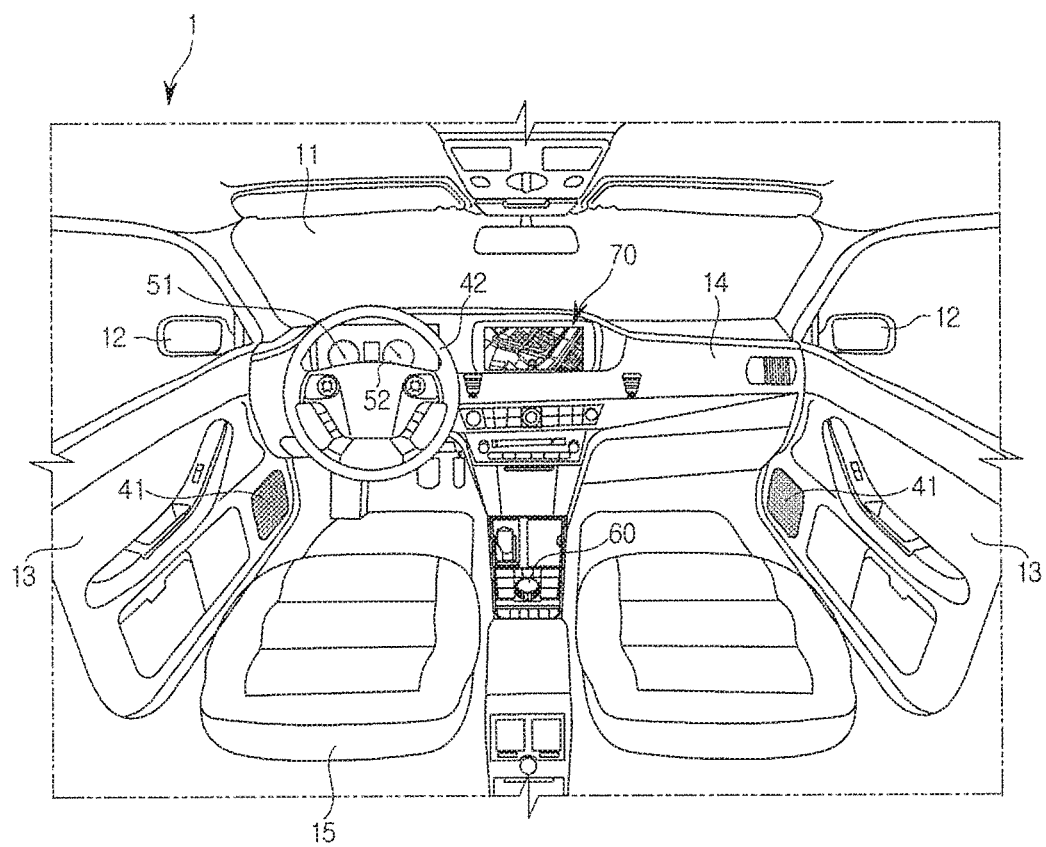
FIG. 2 is a view of an interior of the vehicle.

FIG. 2 is a view of an interior of the vehicle.

The interior of the vehicle 1 may include a dashboard 14 in which a variety of devices are installed to allow a driver to operate the vehicle 1, a driver seat 15 in which the driver is seated, a cluster display 51 and 52 configured to display operation information of the vehicle 1, and a navigator 70 configured to perform an audio function and a video function as well as a navigation function guiding a driving route from a departure to a destination in response to an operation command of the driver.

The dashboard 14 may protrude from a lower side of the windscreen 11 to the driver so that the driver may operate a variety of devices installed in the dashboard 14 while staring at the front.

The driver seat 15 may be provided in a rear side of the dashboard 14 so that the driver may drive the vehicle 1 in a stable position while staring at the front and the variety of devices of the dashboard 14.

The cluster display 51 and 52 may be provided in the driver seat 15 of the dashboard 14 and include a speedometer 51 indicating a driving speed of the vehicle 1 and a revolutions per minute (RPM) gauge 52 indicating a rotation speed of a driving device (not shown).

The navigator 70 may include a display displaying road information related to the traveling road of the vehicle 1 or a route to a destination; and a speaker 41 outputting a sound according to an operation command of the driver. In recent, an audio video navigation (AVN) device in which an audio device, a video device and a navigation device are integrally formed, has been installed in a vehicle.

The navigator 70 may be installed in a center fascia. The center fascia may represent a control panel between a driver seat and a passenger seat in the dash board 14, and may represent a portion in which the dash board 14 and a shift lever are vertically joined. In addition, an air conditioning device, a heater controller, a blowing port, a cigar jack, an ashtray, and a cup holder as well as the navigator 70 may be installed in the center fascia. The center fascia together with a center console may distinguish between the driver seat and the passenger seat.

The vehicle 1 may have an additional jog dial 60 to operate to drive a variety of devices including the navigator 70.

According to the present disclosure, the jog dial 60 may perform an operation by being rotated or pressed, and may have a touch pad having a touch recognition function to perform a handwriting recognition by using the user's finger or an additional device having a touch recognition function.

Figure 3:
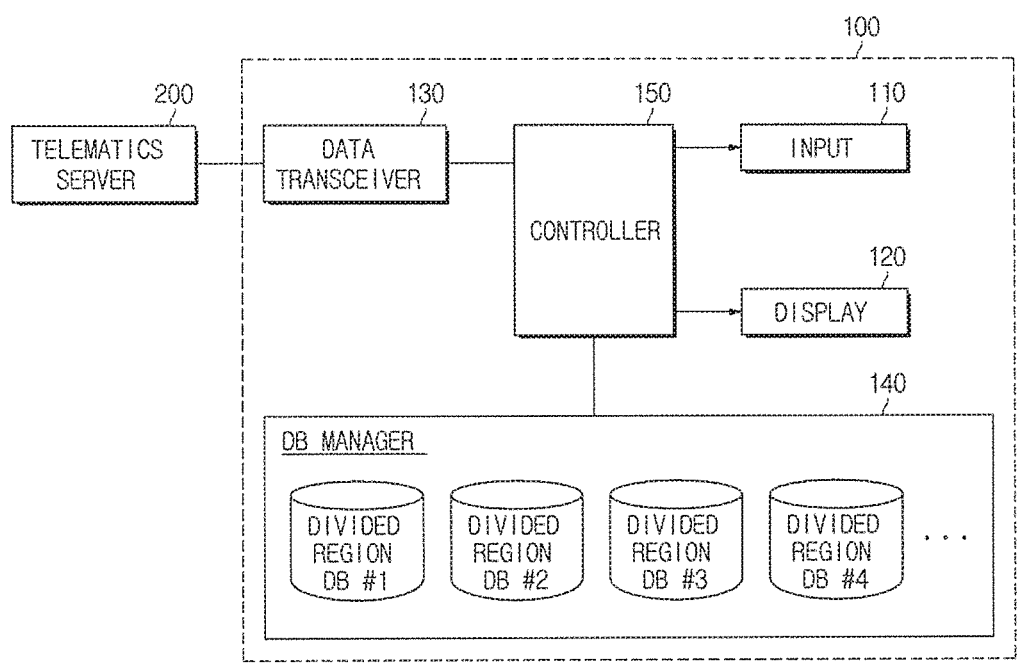
FIG. 3 is a control block diagram illustrating a configuration of a navigator in detail.

FIG. 3 is a control block diagram illustrating a configuration of a navigator in detail.

Figure 4:
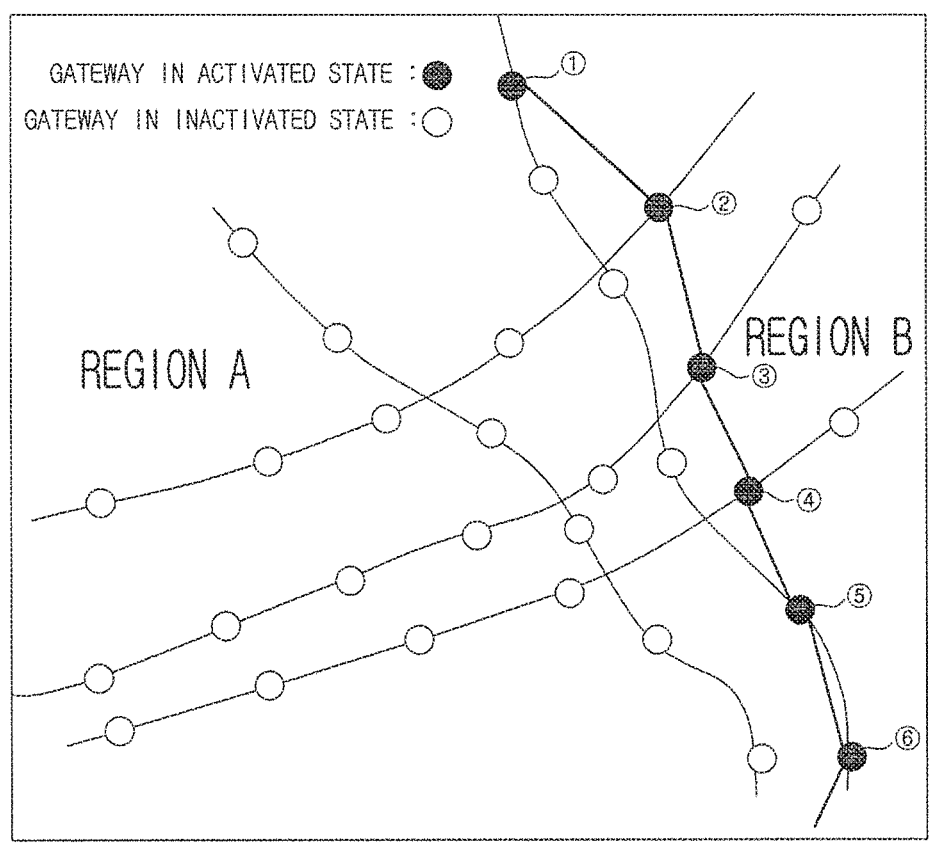
FIGS. 4 to 6 are views illustrating a method for updating map data.
Figure 5:
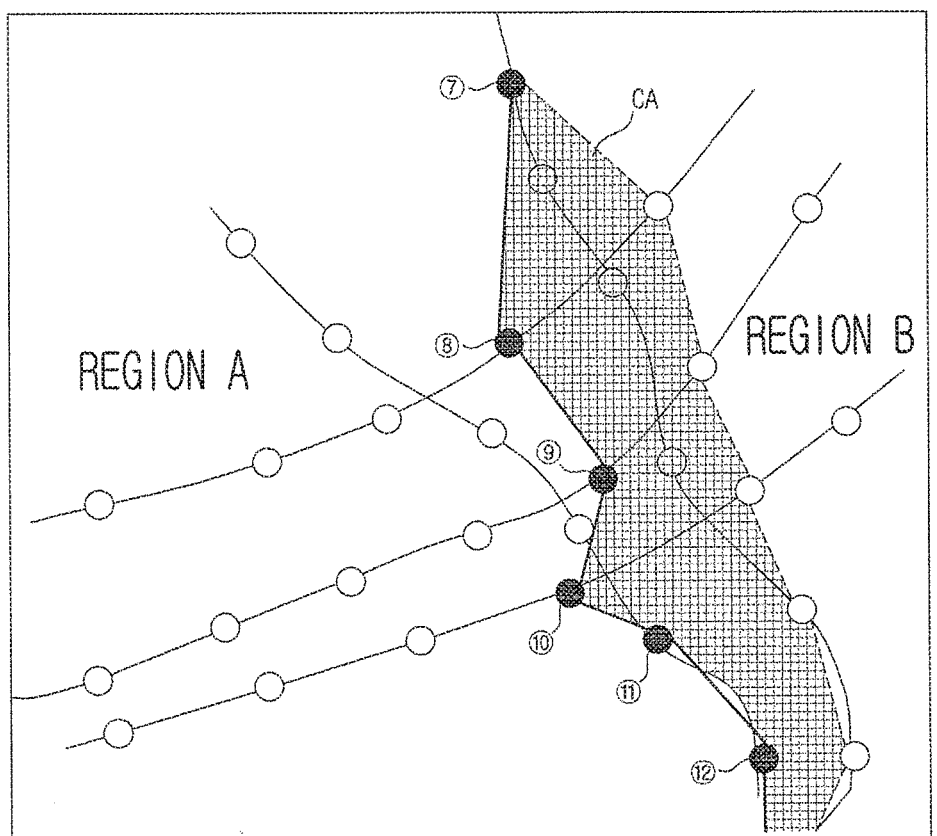
Figure 6:
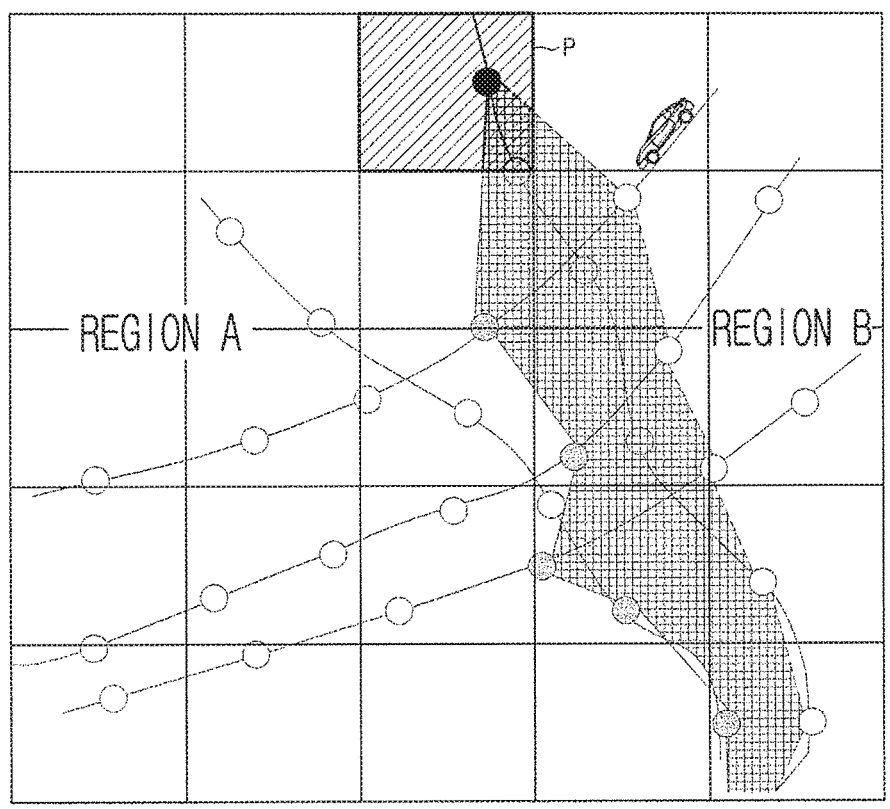

FIGS. 4 to 6 are views illustrating a method for updating map data. Hereinafter a description thereof will be described with reference to FIGS. 4 to 6.

Referring to FIG. 3, a navigator 100 may include an input 110, a display 120, a data transceiver 130, a DB manager 140 and a controller 150.

The input 110 may be a component configured to receive control information such as a destination, from a user for the control of the operation of the navigator 100.

The input 110 may include hardware type devices, e.g., a variety of buttons, switches, pedals, keyboards, mouse, track-balls, a variety levers, handles and sticks, for the input by a user.

The input 110 may include software type devices, e.g., Graphical User interface (GUI) such as a touch pad for the input by a user. The touch pad may be implemented by Touch Screen Panel (TSP) and thus the touch pad may have a layer structure with the display 120.

The display 120 may display route guidance information, control information received via the input 110 and a variety of information implemented on the navigator 100, on a screen so as to allow a user to confirm the information. Although not shown in the drawings, the information output on the display 120 may be output in a voice type through an output portion. In the present disclosure, the display 120 may be an output device for presentation of information in visual or tactile form.

The display 120 may be implemented by Cathode Ray Tube (CRT), Digital Light Processing (DLP) panel, Plasma Display Penal, Liquid Crystal Display (LCD) panel, Electro Luminescence (EL) panel, Electrophoretic Display (EPD) panel, Electrochromic Display (ECD) panel, Light Emitting Diode (LED) panel or Organic Light Emitting Diode (OLED) panel. The implementation of the display is not limited thereto.

The data transceiver 130 may receive and transmit changed map data including a gateway list and difference data corresponding to information related to a boundary between divided regions. The data transceiver 130 may receive map data from a telematics server 200. In the present disclosure, the data transceiver 130 may be a hardware device comprising both a transmitter and a receiver that are combined and share common circuitry or a single housing. The transceiver 130 may be utilized by Fiber-optic gigabit, 10 Gigabit Ethernet, 40 Gigabit Ethernet, and 100 Gigabit Ethernet, and examples of the transceiver 130 include gigabit interface converter (GBIC), small form-factor pluggable (SFP), enhanced small form-factor pluggable (SFP+), quad small form-factor pluggable (QSFP), XRP, XAUI, XCP, and C form-factor pluggable (CFP).

In addition, the DB manager 140 may be a computer program or a set of computer programs that provide basic database management functionalities, and may be used to manage local and remote databases. The DB manager 140 may connect to a database and display information from catalogs that are part of the database.

The controller 150 may be an electronic control unit (ECU) for controlling one or more of electrical system or subsystems. Such a controller is configured to control various electronic devices of the vehicle, and may include several system embedded therein to perform necessary functions.

In addition, the various embodiments disclosed herein, including embodiments of the navigator, vehicle and/or elements thereof, can be implemented using one or more processors coupled to a memory (or other non-transitory machine readable recording medium) storing computer-executable instructions for causing the processor(s) to perform the functions described above including the functions described in relation to the controller 150, the input 110, the data transceiver 130, the display 120, and/or the DB manager 140.

When the gateway is defined in map data stored in the DB manager 140, the gate list received via the data transceiver 130 may include only gateway identification information. Referring to FIG. 5, the gateway list may include only identification (ID) of gateways ⑦, ⑧, ⑨, ⑩, ⑪ and ⑫. According to the present disclosure, it may be possible to simplify DB management for each divided region and to minimize difference data.

Referring to FIGS. 4 and 5, the gateway may include gateways in an activated state (①, ②, ③, ④, ⑤, ⑥, ⑦, ⑧, ⑨, ⑩, ⑪, and ⑫) corresponding to the boundary, and gateways in an inactivated state, except the gateway in the activated state. A case in which the gateway is defined in the map data stored in the DB manager 140 may represent that the DB manager 140 stores both of information related to the gateway in the activated state and information related to the gateway in the inactivated state.

When the gateway is not defined in the map data stored in the DB manager 140, the gateway list received by the data transceiver 130 may include gateway information such as coordinates, link information of a current region and link information of an adjacent region.

In this case, according to the present disclosure, it may be possible to minimize map data capacity stored in the DB manager 140 since the information related to the gateway in the inactivated state is not stored in the DB manager 140. Referring to FIGS. 4 to 5, the gateway may include gateways in the activated state (①, ②, ③, ④, ⑤, ⑥, ⑦, ⑧, ⑨, ⑩, ⑪, and ⑫ ) corresponding to the boundary, and gateways in the inactivated state, except the gateway in the activated state. A case in which the gateway is not defined in the map data stored in the DB manager 140 may represent that the DB manager 140 stores only information related to the gateway in the activated state.

The data transceiver 130 may communicate with the telematics server 200 providing the map data, to receive the changed map data. In this case, the difference data may represent delta data, and may correspond to changed data in the map data.

Alternatively, as well as the changed map data, the data transceiver 130 may request and receive unchanged map data to and from the telematics server 200, as needed.

When the changed map data is present, the data transceiver 130 may receive the map data from the telematics server 200, or alternatively, the data transceiver 130 may actively request and receive map data to and from the telematics server 200 in response to the request of the controller 150.

The data transceiver 130 may be connected to a communicator (not shown) for transmitting and receiving data to and from an external device including the telematics server 200.

The communicator may include one or more components configured to allow the communication with an external device, wherein the communicator may include at least one of a short range communication module, a wired communication module, and a wireless communication module.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module may include a variety of wired communication module, e.g., Controller Area Network (CAN) communication module, Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard232 (RS-232), or plain old telephone service (POTS).

The wireless communication module may include a wireless communication module supporting a variety of wireless communication methods, e.g., Radio Data System-Traffic Message Channel (RDS-TMC), Digital Multimedia Broadcasting (DMB), Wifi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE).

The wireless communication module may include a wireless communication interface having an antenna and a receiver that receives traffic information signal. In addition, the wireless communication module may further include a traffic information signal conversion module for demodulating a wireless signal in the analog type, which is received via the wireless communication interface, into a digital control signal.

The communicator may further include an internal communication module (not shown) for the communication among the electronic devices in the vehicle 300. The internal communication protocol of the vehicle 300 may include Controller Area Network (CAN), Local Interconnection Network (LIN), FlexRay, or Ethernet.

The DB manager 140 may separately store and manage the map data for each divided region and update the map data for each divided region under the control of the controller 150.

As illustrated in FIG. 3, the DB manager 140 may be provided with map DB for each divided region (e.g., divided region DB #1, divided region DB #2, divided region DB #3, divided region DB #4, . . . ).

The DB manager 140 may manage the map DB for each divided region. According to an instruction of the controller 150, the DB manager 140 may provide the map data or update the map data such as deletion, addition, and change of the map data, when performing the route guidance.

The DB manager 140 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage is not limited thereto. The DB manager 140 may be a memory that is implemented by a separate memory chip from the aforementioned processor related to the controller 150 or the storage may be implemented by a single chip with a processor.

The controller 150 may control the update of the map data for each divided region based on the gateway list transmitted from the data transceiver 130. The gateway may include coordinates, link information of the current region, and link information of the adjacent region.

The gateway list defines a boundary dividing two regions. When the boundary between two regions is changed, the controller 150 may change a boundary of the map data by using gateway list instead of the difference data, and perform the update of the map data according to the changed boundary.

The gateway list may be configured such that gateways are sequentially arranged from one side to the other side of the boundary. That is, the gateway list may be configured to arrange the gateways ⑦, ⑧, ⑨, ⑩, ⑪ and ⑫ in the order.

Referring to FIG. 4, the gateway (e.g. ①, ②, ③, ④, ⑤, and ⑥) may include coordinates of the current gateway (coordinates of ①), link information of region A in which a gateway ① is located, and link information of adjacent region B. In this case, it is understood that the link information of region A and the link information of region B correspond to link information related to the gateway ①.

For example, the controller 150 may set the gateway list as a new boundary, copy map data indicating an area between the previous boundary and the new boundary, from the map data of the previous region into map data of the new region, and delete the map data indicating the area between the previous boundary and the new boundary from the map data of the previous region.

Referring to FIG. 4, the gateway list corresponding to the previous boundary between the region A and the region B may include the gateways ①, ②, ③, ④, ⑤, and ⑥.

When the boundary between the region A and the region B is changed as shown in FIG. 5, the controller 150 may receive the gateway list including ID of the gateways ⑦, ⑧, ⑨, ⑩, ⑪ and ⑫ from the data transceiver 130. Referring to FIG. 5, the controller 150 may set the received gateway list as the new boundary (⑦, ⑧, ⑨, ⑩, ⑪ and ⑫) and copy map data such as a road, a background and search, of an area (CA) between the previous boundary and the new boundary, from a divided region DB of the region A into a divided region DB of region B.

Further, the controller 150 may delete the map data of area CA, from the divided region DB of the region A.

For example, when the divided region DB of the region A corresponds to the divided region DB #1 and the divided region DB of the region B corresponds to the divided region DB #2, the controller 150 may copy the map data corresponding to the area CA of the divided region DB #1 into the divided region DB #2 and delete the map data corresponding to the area CA of the divided region DB #1 from the divided region DB #1.

Alternatively, the controller 150 may redundantly store map data of the boundary when moving map data according to the boundary defined by the new gateway list. Since the boundary is a straight line connecting the gateways, a complicated calculation may be required to distinguish a background image and place of interest (POI) of the map data. In order to simplify this, the controller 150 may perform a process so that the divided parcel can be stored redundantly.

Particularly, the controller 150 may set the gateway list as a new boundary and copy map data indicating an area between the previous boundary and the new boundary, from the map data of the previous region into map data of the new region while the controller 150 may store entire parcel including the new boundary.

Since the controller 150 also redundantly stores the map data of the adjacent boundary, the controller 150 may be not needed to access the map data of adjacent region from other divided region DB when guiding a route in the vicinity of the boundary. Accordingly, it may be easier and more quickly to generate route guidance information.

Referring to FIG. 6, the controller 150 may store the gateways ⑦, ⑧, ⑨, ⑩, ⑪ and ⑫ corresponding to the boundary, and the entire parcel (P) including the straight line connecting the gateways, in the divided region DB of the region B, and thus it may be possible to minimize the access to the divided region DB of the region A in the vicinity of the boundary. straight line connecting the gateways, in the divided region DB of the region B, and thus it may be possible to minimize the access to the divided area DB of the area A in the vicinity of the boundary.

The controller 150 may be implemented using a memory (not shown) storing an algorithm for controlling an operation of components in the vehicle and data related to programs implementing the algorithm, and a processor (not shown) performing the above mentioned operation using the data stored in the memory. The memory and the processor may be implemented in separate chips, or a single chip.

Figure 7:
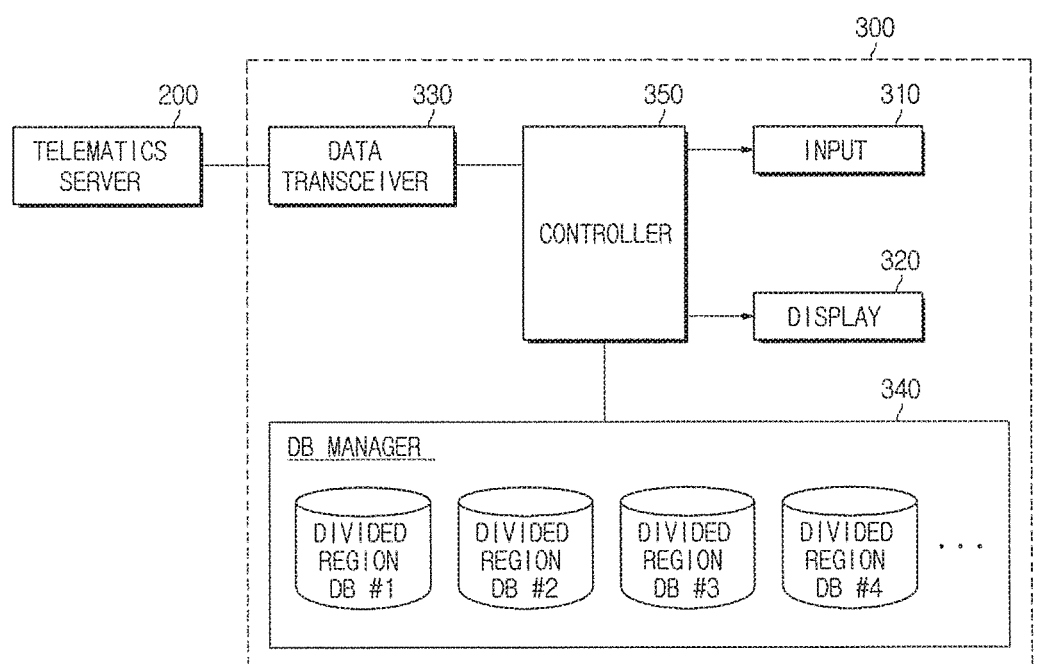
FIG. 7 is a control block diagram illustrating a configuration of the vehicle in detail.

FIG. 7 is a control block diagram illustrating a configuration of the vehicle in detail.

Among configurations disclosed below, a configuration having a name the same as those shown in FIG. 3 may be the same as the configuration of FIG. 3 and thus a description thereof will be omitted.

Referring to FIG. 7, the vehicle 300 may include an input 310, a display 320, a data transceiver 330, a DB manager 340 and a controller 350.

The input 310 may be a component configured to support the input of the user related to the vehicle 300.

The display 320 may display a variety of information related to the vehicle 300, on a screen so as to allow a user to confirm the information. In the present disclosure, the display 320 may be an output device for presentation of information in visual or tactile form The data transceiver 330 may receive and transmit changed map data including gateway list and difference data corresponding to information related to a boundary between divided regions. In the present disclosure, the data transceiver 330 may be a hardware device comprising both a transmitter and a receiver that are combined and share common circuitry or a single housing. The transceiver 330 may be utilized by Fiber-optic gigabit, 10 Gigabit Ethernet, 40 Gigabit Ethernet, and 100 Gigabit Ethernet, and examples of the transceiver 330 include gigabit interface converter (GBIC), small form-factor pluggable (SFP), enhanced small form-factor pluggable (SFP+), quad small form-factor pluggable (QSFP), XRP, XAUI, XCP, and C form-factor pluggable (CFP).

In addition, the DB manager 340 may be a computer program or a set of computer programs that provide basic database management functionalities, and may be used to manage local and remote databases. The DB manager 340 may connect to a database and display information from catalogs that are part of the database.

The controller 350 may be an electronic control unit (ECU) for controlling one or more of electrical system or subsystems. Such a controller is configured to control various electronic devices of the vehicle, and may include several system embedded therein to perform necessary functions.

In addition, the various embodiments disclosed herein, including embodiments of the navigator, vehicle and/or elements thereof, can be implemented using one or more processors coupled to a memory (or other non-transitory machine readable recording medium) storing computer-executable instructions for causing the processor(s) to perform the functions described above including the functions described in relation to the controller 350, the input 310, the data transceiver 330, the display 320, and/or the DB manager 340.

When a gateway is defined in map data stored in the DB manager 340, the gate list received via the data transceiver 330 may include only gateway identification information.

When the gateway is not defined in the map data stored in the DB manager 340, the gateway list received by the data transceiver 330 may include gateway information such as coordinates, link information of a current region and link information of an adjacent region.

The DB manager 340 may separately store and manage the map data for each divided region and update the map data for each divided region under the control of the controller.

The controller 350 may control the update of the map data for each divided region based on the gateway list transmitted from the data transceiver 330.

The gateway may include coordinates, link information of the current region, and link information of the adjacent region.

The controller 350 may set the gateway list as a new boundary, copy map data indicating an area between the previous boundary and the new boundary, from the map data of the previous region into the map data of the new region, and delete the map data indicating the area between the previous boundary and the new boundary from the map data of the previous region.

The controller 350 may set the gateway list as a new boundary and copy map data indicating an area between the previous boundary and the new boundary, from the map data of the previous region to the map data of the new region while the controller 350 may store entire parcel including the new boundary.

FIG. 8 is a flowchart illustrating a control method of the navigator.

First, the navigator 100 may receive changed gateway list (410). At this time, the navigator 100 may be communicatively connected to the telematics server 200 to receive the gateway list from the telematics server 200, either passively or actively.

The gateway may include coordinates, link information of the current region, and link information of the adjacent region. The gateway list may be configured such that gateways are sequentially arranged from one side to another side of the boundary.

When the gateway is defined in the pre-stored map data, the gateway list may include only gateway identification information.

When the gateway is not defined in the pre-stored map data, the gateway list may include gateway information such as coordinates, link information of the current region and link information of the adjacent region.

The navigator 100 may set a new boundary based on the gateway list (430).

The navigator 100 may update the map data for each divided region based on the gateway list (450).

The navigator 100 may copy the map data indicating an area between the previous boundary and the new boundary with respect to the new boundary, from the map data of the previous region into the map data of the new region, and delete the map data indicating the area between the previous boundary and the new boundary from the map data of the previous region.

Alternatively, the navigator 100 may copy map data indicating an area between the previous boundary and the new boundary with respect to the new boundary, from the map data of the previous region to map data of the new region while the navigator 100 may store entire parcel including the new boundary. At this time, the parcel may be defined as a unit configured to divide map data, as shown in P of FIG. 6.

Although not shown, the navigator 100 may generate and provide route guidance information using the updated map data.

The control method of the navigator according to an exemplary embodiment of the present disclosure may be performed by a controller such as an electronic control unit (ECU) installed in the vehicle or navigator. Such a controller is to configured to control various electronic devices of the vehicle, and may include several system embedded therein to perform necessary functions.

As is apparent from the above description, since the map data of the navigator is updated by using the gateway list indicating a boundary between regions, the need of updating entire data for each divided region is eliminated and thus, it is easy to update the map data.

In addition, since the boundary between regions of the map data is changed by using changed gateway list, it is possible to quickly update the map data and thus it is possible to apply the latest map data to the route guidance in real time.

The disclosed embodiments may be implemented as a recording medium storing a command executable by a computer. The command may be stored in the program code type. When executed by the processor, a program module may be generated and perform the disclosed embodiments. The recording medium may be implemented as a computer readable recording medium.

The disclosed embodiments may be implemented as a computer code on a computer readable recording medium. The computer readable recording medium may include various kinds of recording medium stored data decrypted by the computer system. For example, there may be a Read Only Memory (ROM), a Random Access Memory (RAM), a magnetic tape, a magnetic disk, a flash memory, and an optical data storage device Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A navigator comprising:
   a data transceiver configured to receive information related to gateways, wherein the gateways indicates a plurality of coordinates corresponding to a new boundary line dividing two adjacent regions on a map, wherein the information related to the gateways comprises the plurality of coordinates of the gateways on the map;
   a DB manager configured to store map data for each of the two ad adjacent regions, wherein the map data includes information related to previous gateways indicating a plurality of coordinates corresponding to a previous boundary line for the each of the two adjacent regions; and
   a controller configured to:
      set the new boundary line dividing the two adjacent regions on the map based on the information related the gateways;
      identify map data corresponding a region between the previous boundary line and the new boundary line on the map; and
      update the stored map data for the each of the two adjacent regions by copying first map data corresponding to the identified map data from one of the stored map data for the each of the two adjacent regions into the other of the stored map data for the each of the two adjacent regions and deleting the first map data from the one of the stored map data for the each of the two adjacent regions.

2. The navigator of claim 1, wherein the controller copies the first map data from a first region database of first region of the two adjacent regions into a second region database of second region of the two adjacent regions, and
   wherein deletes the first map data from the first region database.

3. The navigator of claim 1, wherein the controller stores entire parcel including the new boundary line.

4. The navigator of claim 1, wherein the controller, when the gateways are not defined in the stored map data, receives the information related to the gateways.

5. The navigator of claim 1, wherein the gateways are sequentially arranged from one side to another side of the new boundary line.

6. A vehicle comprising:
- a data transceiver configured to receive information related to gateways, wherein the gateways indicates a plurality of coordinates corresponding to a new boundary line dividing two adjacent regions on a map, wherein the information related to the gateways comprises the plurality of coordinates of the gateways on the map;
- a DB manager configured to store map data for each of the two adjacent regions wherein the map data includes information related to previous gateways indicating a plurality of coordinates corresponding to a previous boundary line for the each of the two adjacent regions; and
- a controller configured to set the new boundary line dividing the two adjacent regions on the map based on the information related to the gateway, identify map data corresponding a region between the previous boundary line and the new boundary line on the map and update the stored map data for the each of the two adjacent regions by copying first map data corresponding to the identified map data from one of the stored map data for the each of the two adjacent regions into the other of the stored map data for the each of the two adjacent regions and deleting the first map data from the one of the stored map data for the each of the two adjacent regions.

7. The vehicle of claim 6, wherein the controller copies the first map from a first region database of first region of the two adjacent regions into a second region database of second region of the two adjacent regions, and
wherein deletes the first map data from the first region database.

8. The vehicle of claim 6, wherein the controller stores entire parcel including the new boundary line.

9. The vehicle of claim 6, wherein the controller, when the gateways are not defined in the stored map data receives the information related to the gateways.

10. A control method of a navigator comprising:
receiving information related to gateways, wherein the gateways indicates a plurality of coordinates corresponding to a new boundary line dividing two adjacent regions on a map by the navigator, wherein the information related to the gateways comprises the plurality coordinates of the gateways on the map;

setting, by a controller, the new boundary line dividing the two adjacent regions on the map based on the information related the gateways;

identifying map data corresponding a region between the previous boundary line and the new boundary line on the map; and updating, by the controller, the stored map data for each of the two adjacent regions by copying first map data corresponding to the identified map data from one of the stored map data for the each of the two adjacent regions into the other of the stored map data for the each of the two adjacent regions and deleting the first map data from the one of the stored map data for the each of the two adjacent regions.

11. The control method of claim 10, wherein the updating of the stored map data for each of the two adjacent regions comprises;
copying the first map data from a first region database of first region of the two adjacent region into a second region of the two adjacent regions; and
deleting the first map data from the first region database.

12. The control method of claim 10, wherein the control method further comprises storing entire parcel including the new boundary line.

13. The control method of claim 10, wherein the receiving the information related the gateways is performed when the gateways are not defined in the stored map data.

14. The control method of claim 10, wherein the gateways are sequentially arranged from one side to another side of the new boundary line.

* * * * *